(12) United States Patent
Lin

(10) Patent No.: US 7,139,584 B2
(45) Date of Patent: Nov. 21, 2006

(54) APPARATUS AND METHOD FOR MOBILE UNIT POSITIONING

(75) Inventor: Tsui-Tsai Lin, Taoyuan (TW)

(73) Assignee: Benq Mobile System, Inc., Hsinchu (TW)

( * ) Notice: Subject to any disclaimer, the term of this patent is extended or adjusted under 35 U.S.C. 154(b) by 685 days.

(21) Appl. No.: 10/178,835

(22) Filed: Jun. 25, 2002

(65) Prior Publication Data
US 2003/0003924 A1   Jan. 2, 2003

(30) Foreign Application Priority Data
Jun. 26, 2001   (TW) .............................. 90115494 A

(51) Int. Cl.
H04Q 7/20 (2006.01)
(52) U.S. Cl. ............... 455/456.5; 455/561; 455/562.1; 455/456.1; 455/63; 455/423; 375/148
(58) Field of Classification Search ............ 455/456.1, 455/456.5, 500, 110, 562.1, 561; 342/457, 342/465
See application file for complete search history.

(56) References Cited

U.S. PATENT DOCUMENTS

| | | | |
|---|---|---|---|
| 5,592,180 A * | 1/1997 | Yokev et al. ................ | 342/450 |
| 5,883,598 A * | 3/1999 | Parl et al. .................... | 342/457 |
| 6,031,490 A * | 2/2000 | Forssen et al. ............. | 342/457 |
| 6,161,023 A * | 12/2000 | Johnson et al. .......... | 455/562.1 |
| 6,201,499 B1 * | 3/2001 | Hawkes et al. ............. | 342/387 |
| 6,246,884 B1 * | 6/2001 | Karmi et al. ................ | 455/521 |
| 2001/0053698 A1 * | 12/2001 | Karmi et al. ................ | 455/456 |
| 2002/0128020 A1 * | 9/2002 | Carlson et al. ............. | 455/456 |
| 2002/0147007 A1 * | 10/2002 | Hall et al. ................... | 455/423 |
| 2002/0183069 A1 * | 12/2002 | Myr ............................ | 455/456 |
| 2003/0012265 A1 * | 1/2003 | Lin ............................. | 375/148 |
| 2003/0040277 A1 * | 2/2003 | Deats .......................... | 455/63 |
| 2003/0129996 A1 * | 7/2003 | Maloney et al. ............ | 455/456 |
| 2004/0102196 A1 * | 5/2004 | Weckstrom et al. ...... | 455/456.1 |
| 2004/0127260 A1 * | 7/2004 | Boros et al. ............. | 455/562.1 |

FOREIGN PATENT DOCUMENTS

CN            1286008 A       2/2001

* cited by examiner

Primary Examiner—Temica Beamer
Assistant Examiner—Joy K. Contee
(74) Attorney, Agent, or Firm—Rabin & Berdo, P.C.

(57) ABSTRACT

An apparatus for mobile positioning and a method therefor are disclosed for determining the location of a mobile unit in a wireless communication system. First, an angle of arrival of a wireless signal transmitted by a mobile unit and being incident on a base station is determined by using an arrival angle estimator including a switched cross-correlator, an accumulator, and a phase detector. Next, the distance between the mobile unit and the base station is estimated according to timing information provided by the base station, such as timing-advance parameter of global system for mobile communications. The mobile unit is then positioned according to the angle of arrival and the distance between the base station and the mobile unit. Mobile positioning can be achieved according to the invention, using one base station without substantially modifying the existing base stations. In addition, the performance of positioning can be significantly improved.

8 Claims, 7 Drawing Sheets

US 7,139,584 B2

APPARATUS AND METHOD FOR MOBILE UNIT POSITIONING

This application incorporates by reference of Taiwan application Serial No. 90115494, filed on Jun. 26, 2001.

BACKGROUND OF THE INVENTION

1. Field of the Invention

The invention relates in general to the apparatus and method for mobile unit positioning, and more particularly to the apparatus and method for mobile unit positioning utilizing angle of arrival and the timing information of the base station.

2. Description of the Related Art

The wireless communication system is popularly used for convenience. Because of mobile users' safety, the wireless communication system is recently required to be capable of determining the positions of mobile units. Because of the positions of mobile callers, the emergency responsiveness of the emergency service, such as 911 service, can be improved. A network-based position location system, for example, uses the given position of a base station (BS) to locate a mobile unit (MU) of the BS. The MU may be a cellular phone or other mobile communication device. The conventional positioning system determines the position of an MU by either the angle-of-arrival (AOA) of the incoming wireless signal or the timing-advance parameter thereof.

FIG. 1 is a diagram showing a mobile positioning system by using AOA. In FIG. 1, an MU is positioned at the intersection of the first line of bearing (LOB) L1 and the second LOB L2. The first base station, BS1, and the second base station, BS2, each have an antenna array. A wireless signal 110 is emitted by the MU in all directions and then arrives at the base stations BS1 and BS2. The AOA $\theta_1$ of the BS 1 and the AOA $\theta_2$ of the BS2 are obtained by performing an array signal processing on the received wireless signal. LOB L1 and LOB L2 are generated according to the angles of arrival $\theta_1$ and $\theta_2$, and then the MU is located at the intersection of LOB L1 and LOB L2. From the above description, at least two BSs are required to determine the position of the MU. For more accurate position of the MU, more BSs are required to estimate the AOA of the MU. However, the complexity of the base stations increases. In the existing wireless communication system, each base station using space diversity technology has two or three antennas only, while the above-mentioned base station with AOA positioning capability needs an antenna array. The base station using space diversity technology is widely used because it is simpler and able to reduce most of the fading effect. Thus, great efforts in modifying the existing wireless system makes the AOA mobile positioning system difficult to realize in practice. In addition, the cost is much higher if antenna-array base stations are used.

FIG. 2 is a diagram showing a mobile positioning system by using the single cell timing-advance (TA) positioning method with cell global identity (CGI). The cell of each base station has a specific CGI for identifying the position of the BS. The timing-advance parameter is the time that the wireless signal 110 takes to transmit from the MU to the BS. The distance D between the MU and the BS is obtained according to the speed of the wireless signal 110 and the timing-advance parameter. The MU is located at the circle around the BS with a radius of the distance D. The accuracy of the position of the MU depends mainly on the accuracy of the timing-advance parameter. In GSM system, the error of the timing-advance parameter is ½ bit, which results in a location estimation error of 550 meter. In other words, the position of the mobile unit in the GSM system lies on the ring with a width of 550 m around the base station. The position of the mobile unit can be more definite if more base stations are used in the mobile positioning.

The disadvantages of the conventional mobile positioning methods are as follows: (1) It is uneconomical and complicated in implementation. The AOA positioning method requires at least two base stations to determine a mobile location and each of them needs to be formed with an antenna array, for example. (2) It is cost-inefficient for obtaining a more accurate mobile location. In the TA positioning method, for example, a single base station is incapable of positioning accurately. For obtaining more accurate mobile location, multiple base stations should be required.

SUMMARY OF THE INVENTION

It is therefore an object of the invention to provide a method for mobile positioning so as to perform mobile positioning using one base station without substantially modifying the existing base stations. In addition, the performance of positioning can be significantly improved.

It is another object of the invention to provide a method and an apparatus for estimating angle of arrival. The apparatus and method for estimating angle of arrival are based on the existing antenna with space diversity technique that is widely used in wireless communications systems to reduce the fading effect of the radio signal which is introduced by multi-path signals so as to determine the angle of arrival of the radio signal and reduce the implementation cost of the base station.

The invention achieves the above-identified object by providing a method of mobile positioning for use in a base station of a wireless communication system for positioning a mobile unit according to a wireless signal transmitted by the mobile unit. The base station includes a first antenna and a second antenna. The first antenna sends a first communication signal to the base station according to the wireless signal which transmitted by mobile unit and the second antenna sends a second communication signal to the base station according to the wireless signal which transmitted by mobile unit. The method includes the following steps. First, the mobile unit transmits the wireless signal. Second, a distance between the mobile unit and the base station according to timing information provided by the base station is calculated. Next, an angle of arrival which the wireless signal makes with respect to the base station is calculated according to the first communication signal and the second communication signal. The mobile unit is then positioned according to the angle of arrival and the distance.

The invention achieves another above-identified object by providing an arrival angle estimator for determining an arrival angle, wherein the arrival angle is an incident angle of a radio signal from a mobile unit with respect to a base station. The base station includes a first antenna and a second antenna. The first antenna is used for receiving the radio signal and producing a first communication signal according to the radio signal received by the first antenna. The second antenna is used for receiving the radio signal and producing a second communication signal according to the radio signal received by the second antenna. The arrival angle estimator includes a switched cross-correlator, an accumulator, and a phase detector. The switched cross-correlator is used for receiving the first communication signal and the second communication signal in a time-switching manner, performing a cross-relational operation on the first communication signal and the second communication signal, and outputting a plurality of cross-correlation parameters. The accumulator, coupled to the switched cross-correlator, is used for receiving the cross-correlation parameters and outputting an average of the cross-correlation parameters according to the cross-correlation parameters. The phase detector, coupled to the accumulator, is used for receiving the average of the cross-correlation parameters and outputting an arrival angle according to the average of the cross-correlation parameters.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
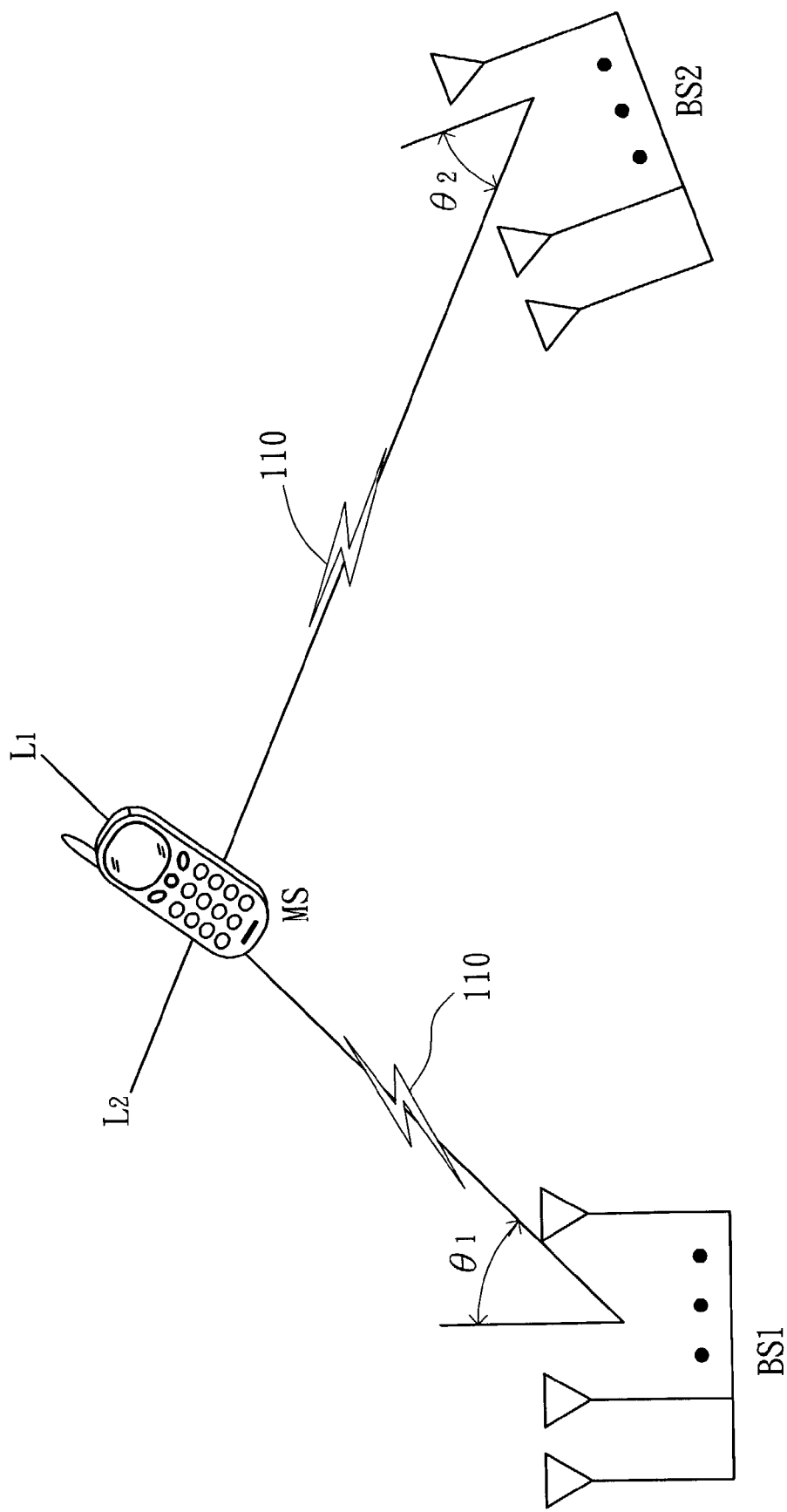
FIG. 1 is a diagram showing a mobile positioning system by using angle of arrival (AOA).
Figure 2:
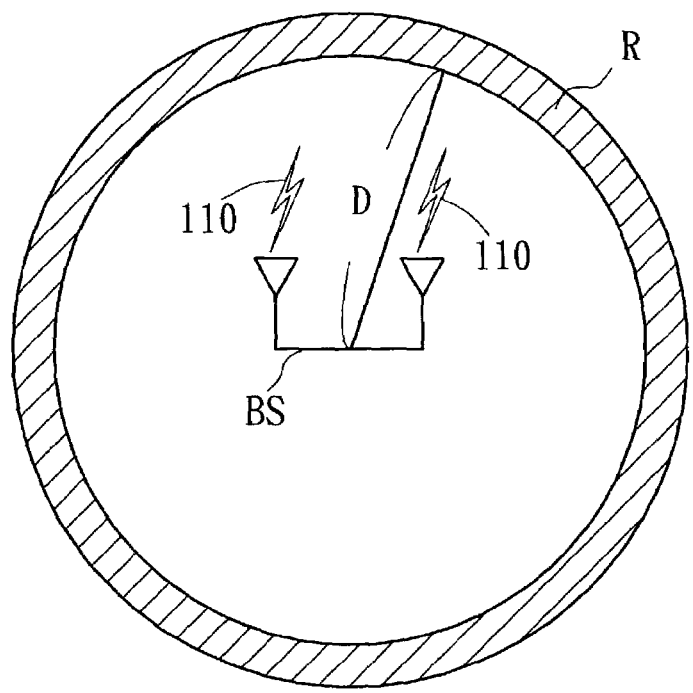
FIG. 2 is a diagram showing a mobile positioning system by using the single cell timing-advance (TA) positioning method with cell global identity (CGI).
Figure 3:
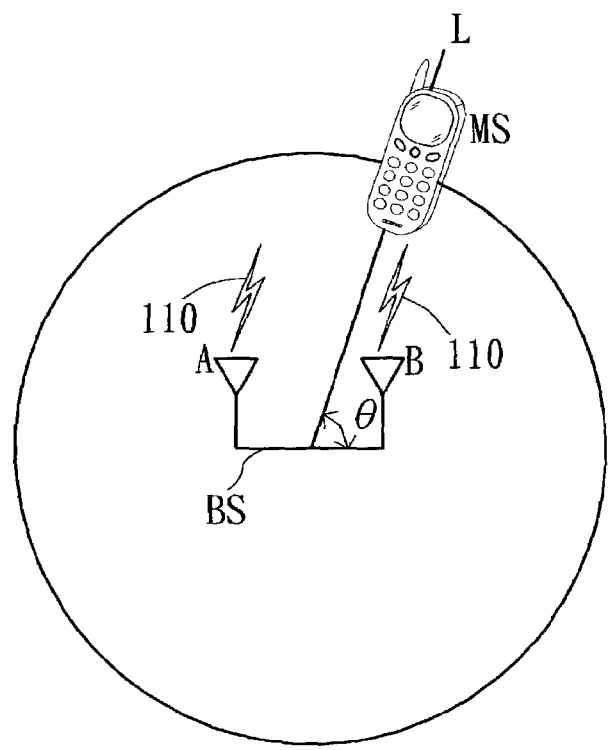
FIG. 3 illustrates a method of mobile positioning according to a preferred embodiment of the invention.
Figure 5:
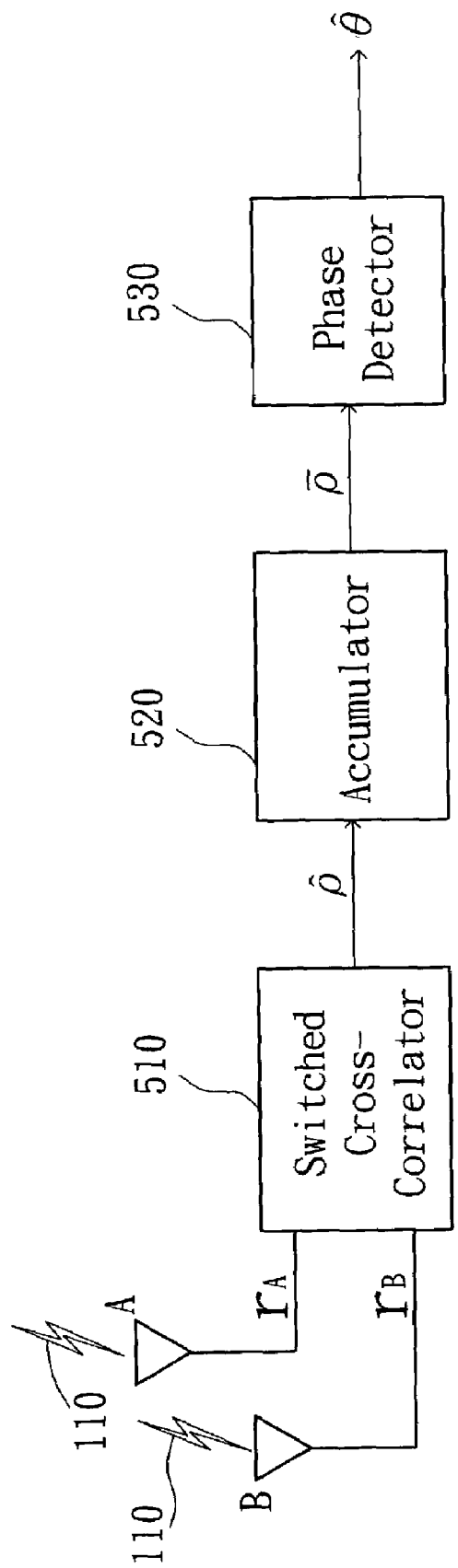
FIG. 5 shows a diagram of an AOA estimator according to the invention.

FIG. 3 illustrates a method of mobile positioning according to a preferred embodiment of the invention. The method makes use of angle of arrival (AOA), timing-advance (TA) parameter and cellular global identity (CGI). Mobile positioning can be achieved by modifying an existing base station, according to the invention. In FIG. 3, the method of mobile positioning is applied to a base station (BS) and the BS determines the location of a mobile unit (MU) according to a radio signal 110 transmitted by the MU. In FIG. 5, The BS includes two antennas A and B. Antenna A receives the radio signal 110 and outputs communication signal $r_A$ according to the radio signal received at antenna A. Antenna B receives the radio signal 110 and outputs communication signal $r_B$ according to the radio signal 110 received at antenna B. The method of mobile positioning according to the invention includes the following steps. First, the BS receives the radio signal 110 from the MU. An estimated distance, D, between the MU and the BS is then calculated, based on timing information, for example, TA parameter, provided by the BS. Next, an AOA estimate of the MU, θ, which is the incident angle of the radio signal 110 with respect to the BS, is determined according to the communication signals $r_A$ and $r_B$. A directional line of bearing, L, is then obtained by using the AOA estimate. Finally, the location of the MU is determined by the intersection of the directional line of bearing and the circle obtained by the estimated distance D. For another objectives of the invention, a method and an apparatus for AOA determination is provided and will be described.

Figure 4:
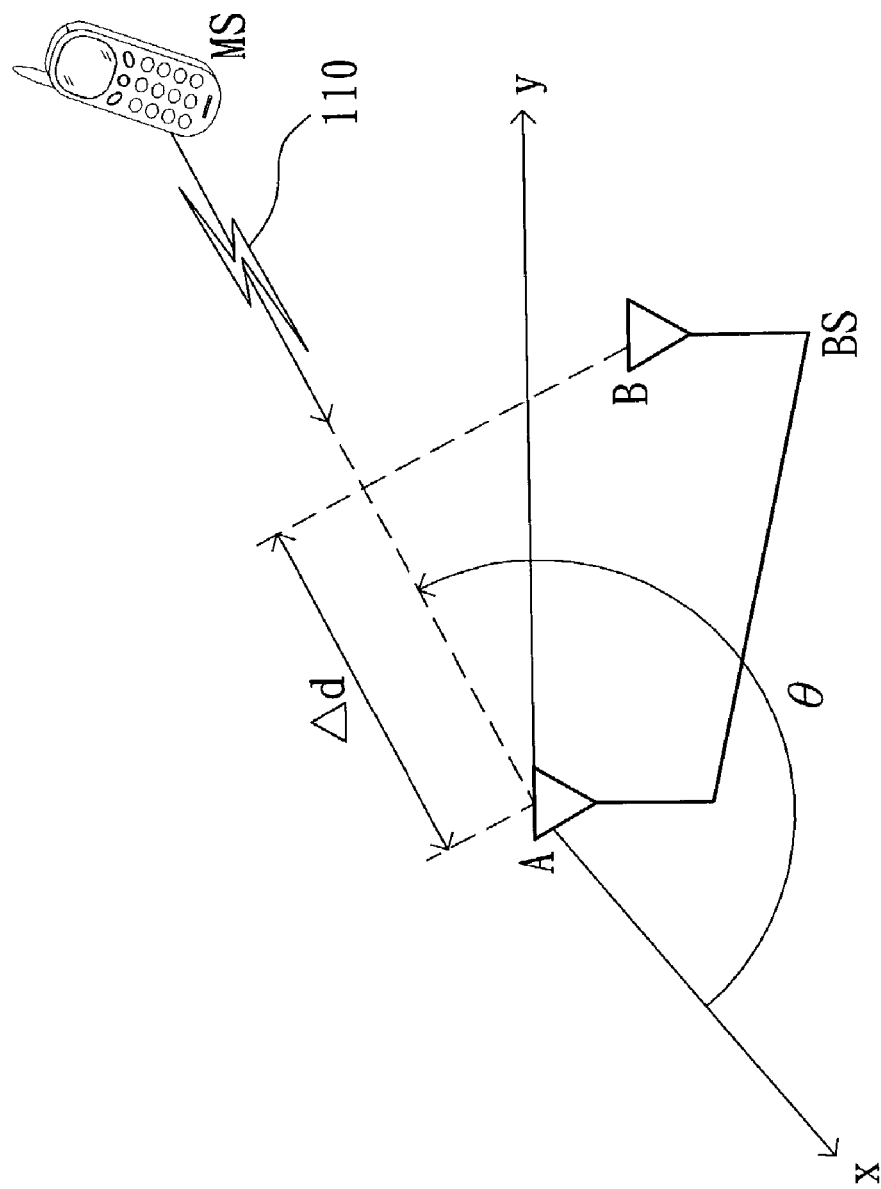
FIG. 4 is a diagram illustrating the geometrical relationship of an AOA of a MU emitting a radio signal incident on a BS.

Base stations based on space diversity technique are widely used in wireless communications system because not only do they effectively reduce the fading effect of the radio signal 110 which is introduced by multi-path signal, but they can also be implemented by a simple structure. Such base stations, in general, include more than one antenna, for example two or three antennas. Each antenna of a base station based on space diversity technique receives communication signal and outputs a signal called a branch output. To achieve reliable communication quality, the locations of the antennas of the base station are spaced out longer than a half of the wavelength so that the amplitudes of the branch outputs are statistically uncorrelated. That is, the expectation of the amplitudes of the branch outputs are equal to zero, as known by persons who are skill in this art. Although the branch outputs are uncorrelated, corresponding phase difference between the branch outputs are related to the respective incident angles of the radio signal 110 incident on their corresponding antennas at different locations. Since the base station can obtain the precise locations of its antennas, a specific incident, that is, θ, of the radio signal 110 can be calculated by using the phase difference between the branch outputs. FIG. 4 is a diagram illustrating the geometrical relationship of an AOA of an MU emitting a radio signal incident on a BS. As shown in FIG. 4, the phase difference Δψ between the radio signal 110 incident on the BS is given by:

$$\Delta\psi = \beta \cdot \Delta d = 2\pi/\lambda \cdot \Delta d \quad (1)$$

where $\beta=2\pi/\lambda$, $\lambda$, $\Delta d$, and θ denote the wave-number, the wavelength, the difference of the transmission distances from MU to the two antennas, and the incident angle (i.e., AOA), respectively. According to equation (1), the phase difference Δψ between the received signals of the antennas A and B depends only on the AOA θ and the relative locations of the antennas A and B. Since the positions of the antennas A and B are known by the BS, the phase difference Δψ can be obtained from the corresponding received signals by employing array signal processing technique. Thus, the AOA θ of the MU can also be calculated. The relationship between communication signal r received at the antennas A and B and their phrase difference Δψ are represented by:

$$r = \begin{bmatrix} r_A \\ r_B \end{bmatrix} = s_d \begin{bmatrix} 1 \\ e^{j\Delta\varphi} \end{bmatrix} + n, \quad (2)$$

where n and $s_d$ denote the noise and the radio signal emitted by the MU, respectively. By performing cross-correlation operation of the communication signals $r_A$ and $r_B$, the following is obtained:

$$\rho = E(r_A r_B^*) = \sigma_d^2 \begin{bmatrix} 1 & e^{-j\Delta\varphi} \\ e^{j\Delta\varphi} & 1 \end{bmatrix} + \sigma_n^2 I, \quad (3)$$

where $\sigma_d^2$ is the power of the communication signals, $\sigma_n^2$ is the power of the noise. The operators E and * denote expectation and conjugate operators, respectively. According to equation (3), the phase difference Δψ can be obtained by performing cross-correlation operation of the communication signals $r_A$ and $r_B$, and then the AOA θ can be obtained according to equation (1).

Based on the principle of the invention described above, the invention further provides an arrival-of-angle (AOA) estimator for detecting the AOA of the radio signal 110 transmitted from the MU with respect to the BS. FIG. 5 shows a diagram of an AOA estimator according to the invention. The AOA estimator includes a switched cross-correlator 510, an accumulator 520, and a phase detector 530. The switched cross-correlator 510 is used for receiving the communication signals $r_A$ and $r_B$, performing cross-correlation operation of the communication signals $r_A$ and $r_B$, and outputting an estimated cross-correlation coefficient $\hat{\rho}$. The accumulator 520 is coupled to the switched cross-correlator 510 and is used to smooth the channel variation during an observation period. In order to smooth the channel variation during an observation period, the accumulator 520 receives cross-correlation coefficients $\hat{\rho}$ from the switched cross-correlator during the observation period, sums up the received cross-correlation coefficients $\hat{\rho}$, and outputs an average cross-correlation coefficient $\bar{\rho}$. The phase detector 530 is coupled to the accumulator 520. The phase detector 530 is used to receive the average cross-correlation coefficient $\bar{\rho}$, perform phase detector, and outputs an estimate of the AOA of the MU, θ.

Figure 6:
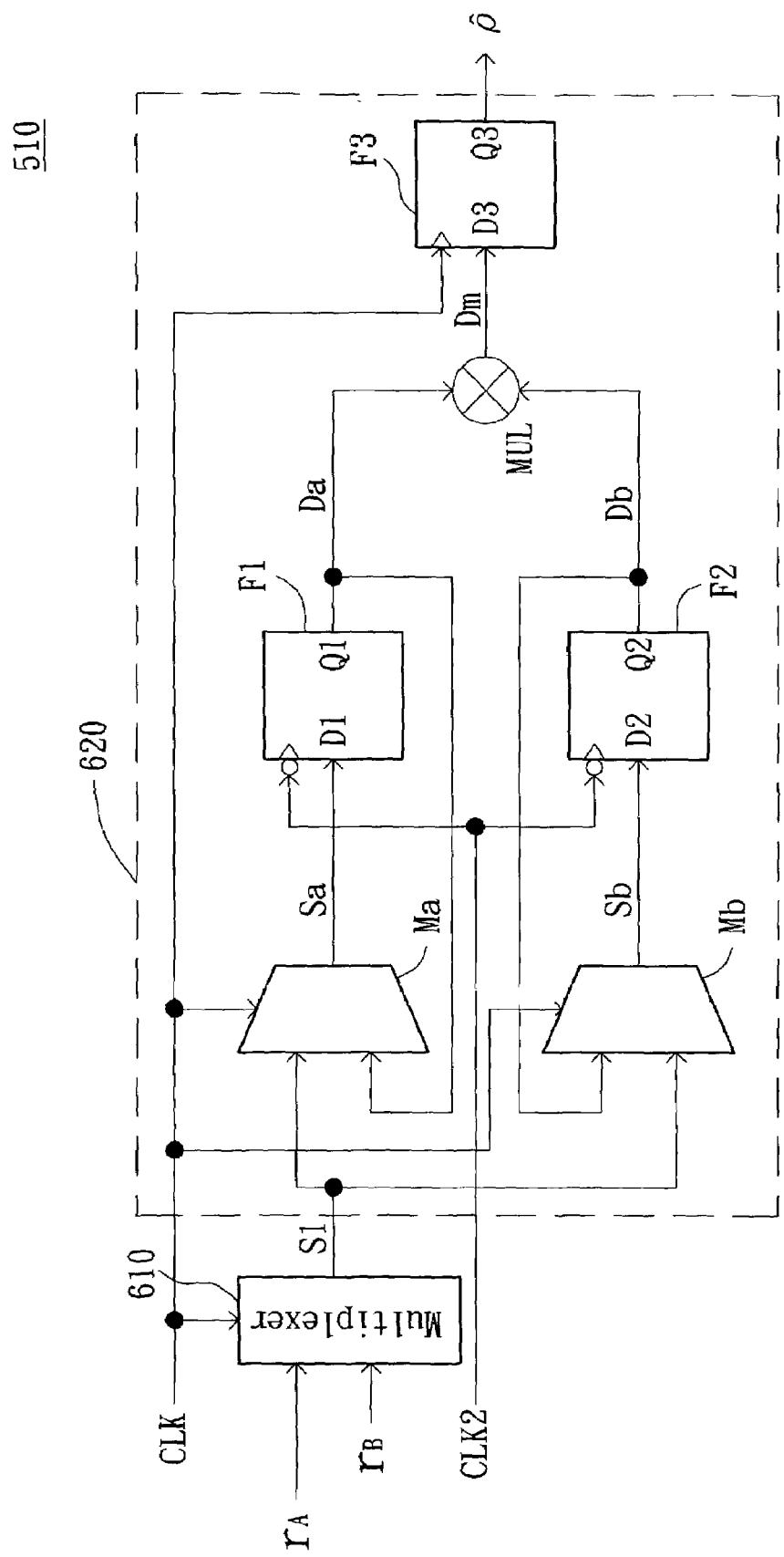
FIG. 6 is a block diagram of the switched cross-correlator shown in FIG. 5.

The AOA estimator 510 estimates an AOA by the following steps. Initially, a count value is set as m and a parameter p is set to zero, where m is a positive integer. First, the switched cross-correlator 510 receives the communication signal $r_A$ during time period T(2k), and then receives the communication signal $r_B$ during time period T(2k+1), wherein k is a positive integer. The switched cross-correlator 510 then obtains a cross-correlation coefficient $\hat{\rho}$ by performing cross-correlation operation of the communication signal $r_A$ received during time period T(2k) and the communication signal $r_B$ during time period T(2k+1). Next, the accumulator 520 obtains a sum parameter A by adding the cross-correlation coefficient and the value of parameter p, and then sets the value of parameter p to sum parameter A. After that, it is determined whether k is less than m. If so, the method is repeated. If not, an average cross-correlation coefficient $\bar{\rho}$ is calculated according to the value of parameter p. Finally, the AOA is obtained according to the average cross-correlation coefficient $\bar{\rho}$ and the relative locations of the antennas A and B. FIG. 6 is a block diagram of the switched cross-correlator 510. The switched cross-correlator 510 includes a multiplexer 610 and a multiplication unit 620. The multiplexer 610 receives communication signals $r_A$ and $r_B$ in a time division manner and selectively outputs one of them as a multiplexed signal S1. The multiplication unit 620, coupled to the multiplexer 610, receives the multiplexed signal S1 and outputs cross-correlation coefficients $\hat{\rho}$. The multiplication unit 620 includes multiplexers Ma, Mb, flip-flops F1, F2, F3, and a multiplier MUL. The communication signal $r_A$ received during time period T0 is defined as communication signal $r_{A0}$, and the communication signal $r_A$ received during time period T1 is defined as communication signal $r_{A1}$. Likewise, the communication signal $r_A$ received time period T2 is defined as communication signal $r_{A2}$, and so on. In the same way, the communication signal $r_B$ is also divided into communication signals $r_{B0}$, $r_{B1}$, $r_{B2}$. The clock signal CLK is at a high level during even time periods, such as T0, T2, T4, and is at a low level during odd time periods, such as T1, T3, T5, and so on. The multiplexer Ma receives the multiplexed signal S1 and a data signal Da, and outputs a multiplexed signal Sa. The multiplexer Mb receives the multiplexed signal S1 and a data signal Db, and outputs a multiplexed signal Sb. The flip-flop F1 receives the multiplexed signal Sa at the data input end D1, receives a clock signal CLK2 at its clock input end, outputs a data signal Da at the data output end Q1, and feeds back the data signal Da to the multiplexer Ma. The flip-flop F2 receives the multiplexed signal Sb at the data input end D2, receives the clock signal CLK2 at its clock input end, outputs a data signal Db at the data output end Q2, and feeds back the data signal Db to the multiplexer Mb. The multiplier MUL multiplies the data signals Da by the data signal Db and outputs a data signal Dm. The flip-flop F3 receives the data signal Dm at the data input end D3, receives the clock signal CLK, and outputs cross-correlation coefficients $\hat{\rho}$. The multiplexers 610, Ma, and Mb respectively output the multiplexed signals S1, Sa, and Sb according to the clock signal CLK. The flip-flops F1 and F2 are negative-edge triggered, and the flip-flop F3 is positive-edge triggered. The clock signal CLK2 is twice the frequency of the clock signal CLK.

Figure 7:
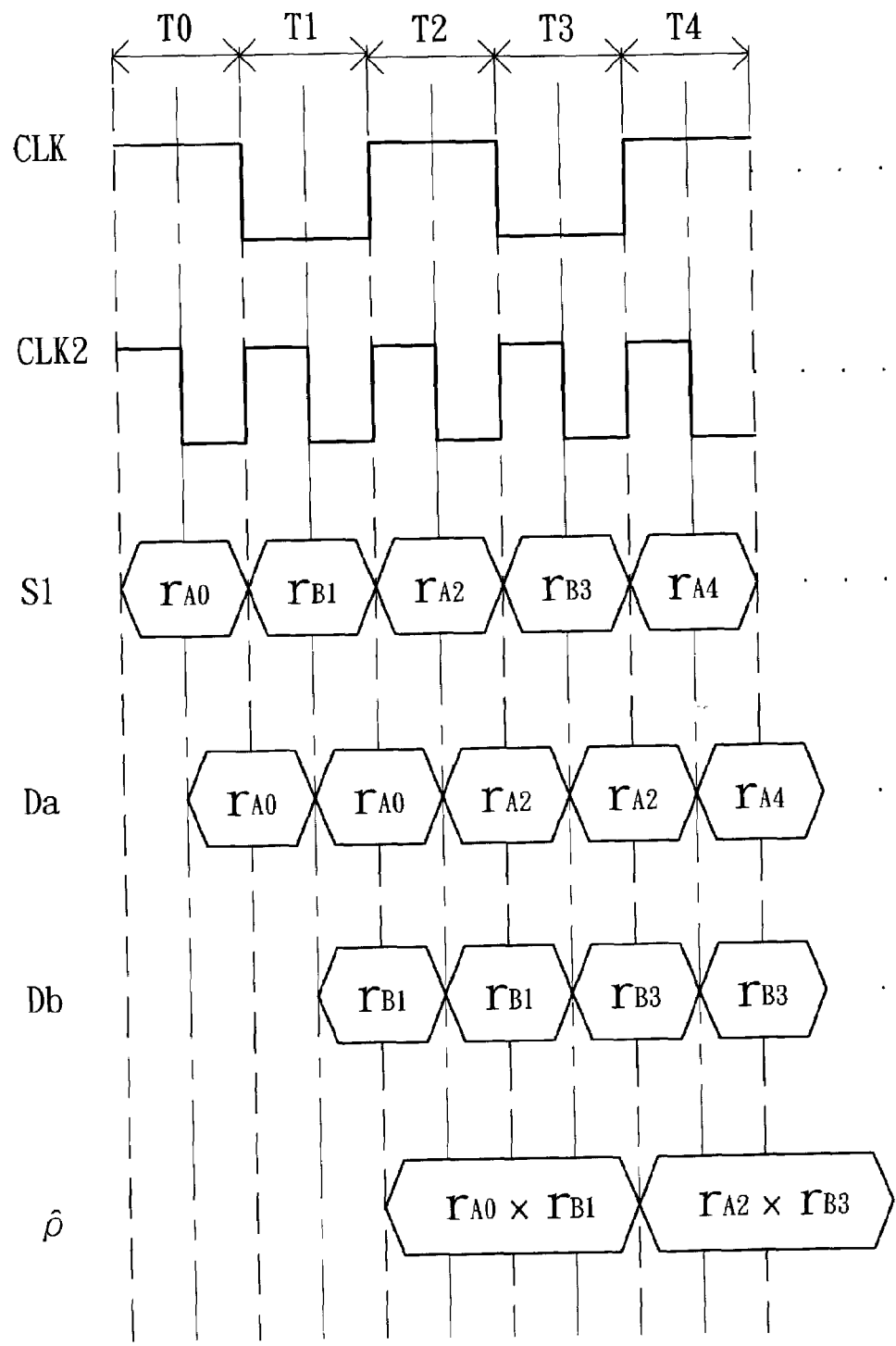
FIG. 7 illustrates a timing diagram of signals in the switched cross-correlator shown in FIG. 5.

FIG. 7 illustrates a timing diagram of signals in the switched cross-correlator 510. During the time period T0, the clock signal CLK is in the high level, and the multiplexed signal S1 outputted by the multiplexer 610 is a communication signal $r_{A0}$. When the clock signal CLK2 changes from the high level to the low level, the filp-flop F1 is triggered and the value of the data signal Da is set equal to the communication signal $r_{A0}$. During the time period T1, the clock signal CLK is in the low level, and the multiplexed signal S1 outputted by the multiplexer 610 is a communication signal $r_{B1}$. When the clock signal CLK2 changes from the high level to the low level, the filp-flop F2 is triggered and the value of the data signal Db is set equal to the communication signal $r_{B1}$. At this time, the multiplier MUL outputs $r_{A0} \times r_{B1}$. At the beginning of the time period T2, the clock signal CLK changes to the high level, and the filp-flop F3 is triggered to set the value of the data signal Dm equal to the value of $r_{A0} \times r_{B1}$, i.e., the cross-correlation coefficient $\hat{\rho}(0)$ of $r_{A0}$ and $r_{B1}$. During the time period T4, the value of the data signal Dm is $r_{A2} \times r_{B3}$, i.e., the cross-correlation coefficient $\hat{\rho}(1)$ of $r_{A2}$ and $r_{B3}$.

Figure 8:
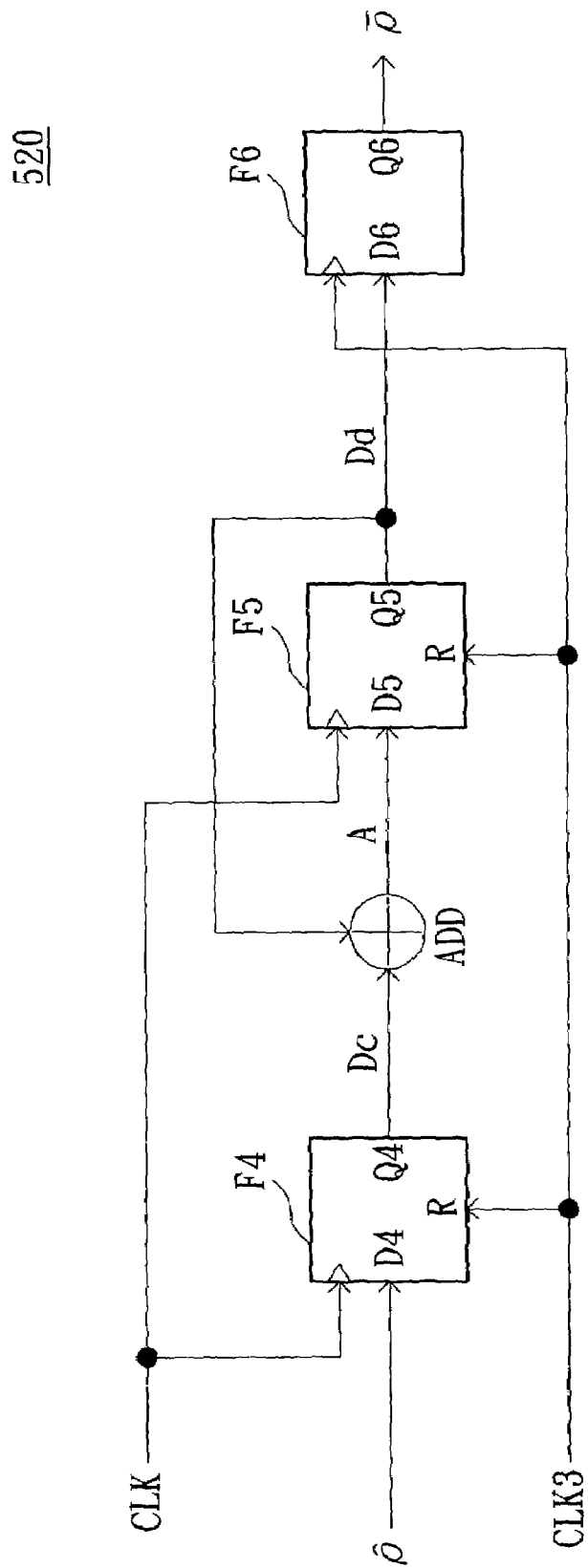
FIG. 8 illustrates a circuit diagram of the accumulator shown in FIG. 5.

FIG. 8 illustrates a circuit diagram of the accumulator 520. The accumulator includes filp-flops F4, F5, and F6, and an adder ADD. The data input end D4 of the flip-flop F4 receives the cross-correlation coefficient $\hat{\rho}$, the clock input end of that receives the clock signal CLK, and the data output end Q4 of that outputs data signal Dc. The adder ADD is coupled to the filp-flop F4, and is used for receiving data signals Dc and Dd and outputting an average data signal A which is the sum of the data signals Dc and Dd. The flip-flop F5 is coupled to the adder ADD. The data input end D5 of the flip-flop F5 receives the accumulated data signal A, the clock input end of that receives the clock signal CLK, and the data output end Q5 of that outputs data signal Dd. The flip-flop F6 is coupled to the flip-flop F5. The data input end D6 of the flip-flop F6 receives the data signal Dd, the clock input end of that receives the clock signal CLK3, and the data output end Q6 of that outputs average cross-correlation coefficient $\hat{\rho}$. The reset ends of the filp-flops F4 and F5 receive the clock signal CLK3, wherein the frequency of the clock signal CLK3 is 1/N of the frequency of the clock signal CLK, and N is a positive integer. The period of the clock signal CLK3 is an observation period. During one period of the clock signal CLK3, the accumulator 520 finishes adding N cross-correlation coefficients $\hat{\rho}$, and then the filp-flops F4 and F5 are reset, and the accumulator 520 outputs the average cross-correlation coefficient $\bar{\rho}$ according to the data signal Dd. The signal received by the antenna of BS is a decayed signal varied with time and circumstances factors. In order to improve the accuracy of the detection of the decayed signal, all the cross-correlation coefficients $\hat{\rho}$ within the observation period are averaged.

As disclosed above, the invention achieves mobile positioning by only one base station. Moreover, the AOA estimator uses one base station having at least two antennas to estimate the angle of arrival with simple arithmetic operations, so that the existing base stations do not need to be modified substantially for estimating the angle of arrival. Thus, mobile positioning with the existing base stations can be achieved with a reduced cost.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of a mobile unit positioning, for using in a base station of a wireless communication system for positioning the mobile unit according to a wireless signal transmitted by the mobile unit, the base station including a first antenna and a second antenna, the first antenna outputting a first communication signal according to the wireless signal and the second antenna outputting a second communication signal according to the wireless signal, the method comprising the steps of:
    calculating a distance between the mobile unit and the base station according to timing information provided by the base station;
    (a) calculating an angle of arrival which the wireless signal makes with respect to the base station, according to the first communication signal and the second communication signal said step (a) comprising:
        receiving the first communication signal and the second communication signal in a time-switching manner;
        cross-correlating the received first communication signal and the received second communication signal to calculate a plurality of cross-correlation parameters;
        outputting an average of the cross-correlation parameters according to the cross-correlation parameters; and
        determining the angle of arrival according to the average of the cross-correlation parameters and a relative position between the first antenna and the second antenna; and
    positioning the mobile unit according to the angle of arrival and the distance.

2. A method of a mobile unit positioning, for using in a base station of a wireless communication system for positioning the mobile unit according to a wireless signal transmitted by the mobile unit, the base station including a first antenna and a second antenna, the first antenna outputting a first communication signal according to the wireless signal and the second antenna outputting a second communication signal according to the wireless signal, the method comprising the steps of:
    calculating a distance between the mobile unit and the base station according to timing information provided by the base station;
    (a) calculating an angle of arrival which the wireless signal makes with respect to the base station, according to the first communication signal and the second communication signal; and
    positioning the mobile unit according to the angle of arrival and the distance;
    wherein said step (a) comprises:
        setting a count value to m;
        setting a parameter p to zero;
        (b) receiving the first communication signal during an even time period denoted by T(2k);
        (c) receiving the second communication signal during an odd period denoted by T(2k+1);
        (d) calculating a cross-correlation parameter by cross-correlating the first communication signal and the second communication signal; and
        (e) obtaining the sum of the parameter p and the cross-correlation parameter as a sum parameter and setting the value of the parameter p to the sum parameter;
        (f) determining whether k is less than m; if so, adding 1 to k and proceeding to said step (b);
        (g) generating an average cross-correlation parameter according to the sum parameter; and
        (h) determining the angle of arrival according to the average cross-correlation parameter and a relative position of the first antenna and the second antenna;
    wherein k and m are integers.

3. An arrival angle estimator for determining an arrival angle, the arrival angle being an incident angle of a radio signal from a mobile unit with respect to a base station, the base station including a first antenna and a second antenna, the first antenna being used for receiving the radio signal and producing a first communication signal according to the radio signal received by the first antenna, the second antenna being used for receiving the radio signal and producing a second communication signal according to the radio signal received by the second antenna, the arrival angle estimator comprising:
    a switched cross-correlator for receiving the first communication signal and the second communication signal in a time-switching manner, performing a cross-relational operation on the first communication signal and the second communication signal, and outputting a plurality of cross-correlation parameters;
    an accumulator, coupled to the switched cross-correlator, for receiving the cross-correlation parameters and outputting an average of the cross-correlation parameters according to the cross-correlation parameters; and
    a phase detector, coupled to the accumulator, for receiving the average of the cross-correlation parameters and outputting an arrival angle according to the average of the cross-correlation parameters.

4. The arrival angle estimator according to claim 3, wherein the switched cross-correlator comprising:
    a multiplexer for receiving the first communication signal and the second communication signal and outputting a multiplexed signal; and
    a multiplication unit coupled to the multiplexer for receiving the multiplexed signal and outputting the plurality of the cross-correlation parameters according to the multiplexed signal.

5. The arrival angle estimator according to claim 4, wherein the multiplexer according to a clock signal alternately selects one of the first communication signal and the second communication signal as a selected communication signal, and outputs the multiplexed signal according to the selected communication signal.

6. The arrival angle estimator according to claim 3, wherein the multiplication unit, according to the clock signal, performs multiplication of the multiplexed signal during a kth time period and the multiplexed signal during a k+1th time period and outputs the product thereof as one of the cross-correlation parameters.

7. A locating method for using in a wireless communication system, the locating method comprising the steps of:
   determining a distance between a mobile unit and a base station, based on timing information from the mobile unit;
   calculating an arrival angle of a radio signal from the mobile unit according to the radio signal from the mobile unit, wherein the arrival angle is the incident angle of the radio signal with respect to the base station;
   determining a location of the mobile unit, based on the distance and the arrival angle;
   wherein the base station includes a first antenna and a second antenna, the first antenna is used for receiving the radio signal and producing a first communication signal according to the radio signal, the second antenna is used for receiving the radio signal and producing a second communication signal according to the radio signal, and the base station determines the arrival angle by calculating an average of a plurality of cross-correlation parameters according to the first communication signal and the second communication signal, the first communication signal and the second communication signal are received in a time-switching manner, the received first communication signal and the received second communication signal are cross-correlated to calculate the cross-correlation parameters, and the average of the cross-correlation parameters is calculated according to the cross-correlation parameters.

8. A locating method for using in a wireless communication system, the locating method comprising the steps of:
   determining a distance between a first wireless terminal and a second wireless terminal, based on timing information from the first wireless terminal, wherein the second wireless terminal includes first and second antennas, the first antenna for receiving the radio signal and producing a first communication signal according to the radio signal; and the second antenna for receiving the radio signal and producing a second communication signal according to the radio signal;
   determining an arrival angle of a radio signal from the first wireless terminal according to the radio signal from the first wireless terminal, wherein the arrival angle is the incident angle of the radio signal with respect to the second wireless terminal, wherein the arrival angle is determined by calculating an average of a plurality of cross-correlation parameters according to the first communication signal and the second communication signal, the first communication signal and the second communication signal are received in a time-switching manner, the received first communication signal and the received second communication signal are cross-correlated to calculate the cross-correlation parameters, and the average of the cross-correlation parameters is calculated according to the cross-correlation parameters;
   determining a location of the first wireless terminal, based on the distance and the arrival angle.

* * * * *

UNITED STATES PATENT AND TRADEMARK OFFICE
CERTIFICATE OF CORRECTION

PATENT NO. : 7,139,584 B2  Page 1 of 1
APPLICATION NO. : 10/178835
DATED : November 21, 2006
INVENTOR(S) : Tsui-Tsai Lin It is certified that error appears in the above-identified patent and that said Letters Patent is hereby corrected as shown below:

Title Page, Item 73 (Assignee):

Please change "Benq Mobile System, Inc., Hsinchu (TW)", to

-- BENQ CORPORATION, Taoyuan (TW) --

Signed and Sealed this

Sixth Day of March, 2007

JON W. DUDAS
*Director of the United States Patent and Trademark Office*